Dec. 23, 1941.  A. MADLÉ  2,267,034
VARIABLE SPEED TRANSMISSION
Filed Aug. 16, 1937   2 Sheets-Sheet 2
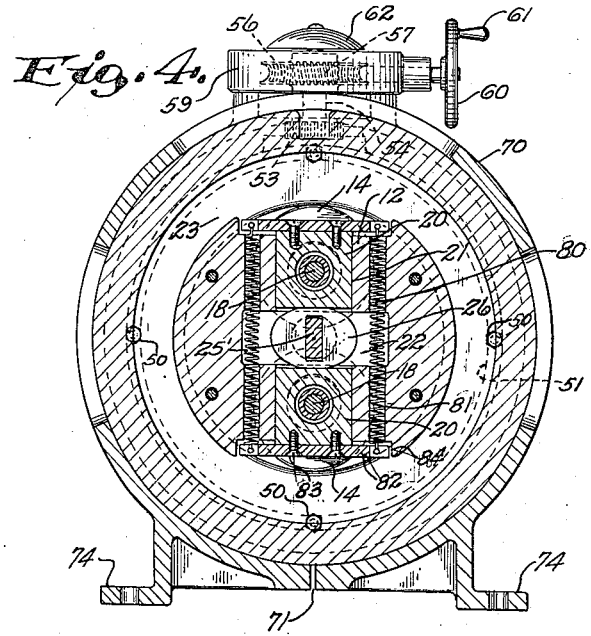
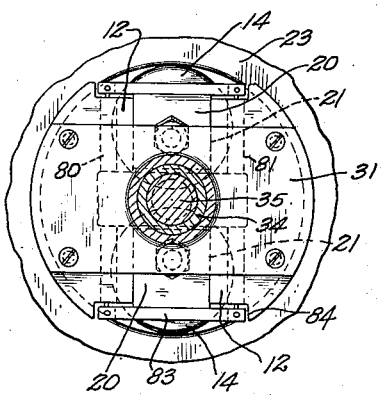
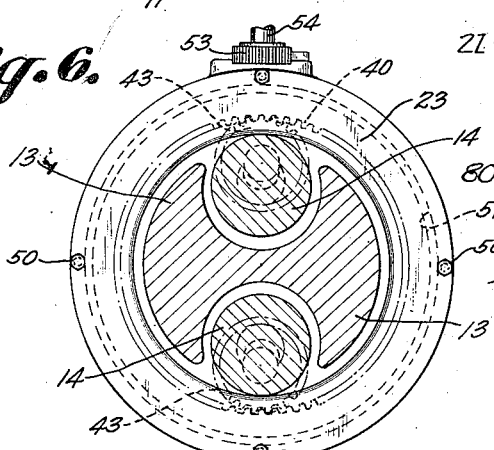
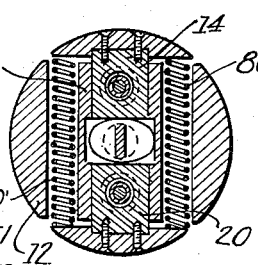
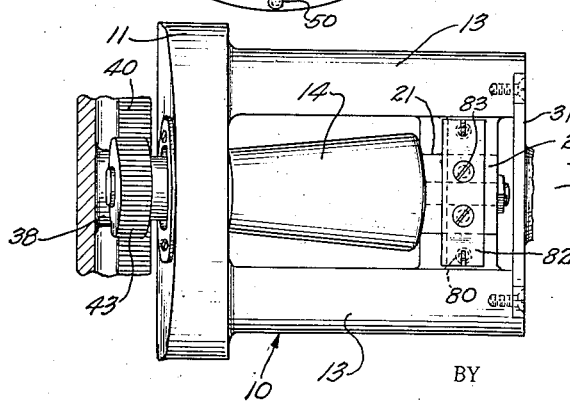
INVENTOR.
ALAIN MADLÉ
BY John W. Michael
ATTORNEY.

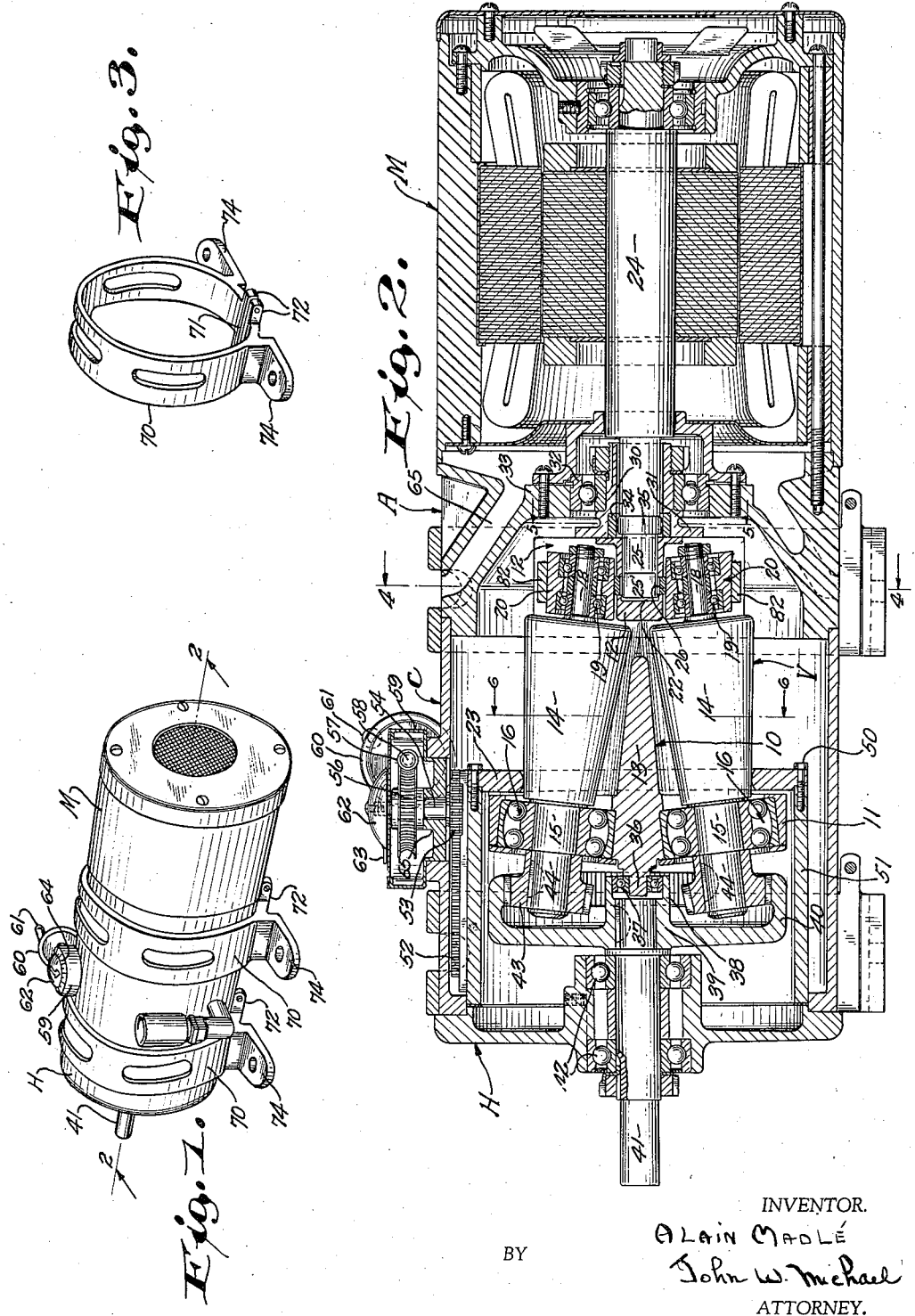

Patented Dec. 23, 1941

2,267,034

UNITED STATES PATENT OFFICE 2,267,034

VARIABLE SPEED TRANSMISSION

Alain Madlé, Chicago, Ill., assignor, by mesne assignments, to Graham Transmissions, Inc., Wilmington, Del., a corporation of Delaware Application August 16, 1937, Serial No. 159,280

20 Claims. (Cl. 74—281)

This invention relates to an improvement in variable speed transmissions of the type wherein a plurality of longitudinally tapered planet rollers are controlled in their action by an encircling traction ring adjustable lengthwise of the rollers to vary the speed and direction of the motion transmitted by the device.

One of the principal objects of the present invention is to provide a novel structural organization for developing the proper working pressure between the planet rollers and their traction ring while avoiding the possibility of overloading the bearings or subjecting the other elements of the transmission to excessive stress or strain and while keeping the size of the various parts and the overall dimension of the device within practical limits.

Generally speaking this is accomplished by so constituting and combining the elements of the transmission that in the development of the working pressure between the rollers and the ring the device is both ratio and torque responsive.

In a typical embodiment of the invention the planet rollers are supported not only for rotation with and with respect to their rotary carrier but also for swinging movement radially of the carrier and about fulcra located adjacent their small ends. In operation, pressure contact creating means embodied in the transmission forces the rollers to swing outwardly about their fulcra into pressure contact with their traction ring in such manner that the leverage through which the force developed by the pressure contact creating means acts is determined by the position of the traction ring lengthwise of the planet rollers. As the traction ring is moved toward the small end of the planet rollers the effect of this force in establishing a working pressure between the planet rollers and the ring is increased. This is desirable as it results in the development of the required torque at any speed. With the present invention pressure contact between the planet rollers and their traction ring is developed primarily by combining a torque responsive device with the drive shaft, the large end of the planet rollers and their rotary carrier in such manner that the large ends of the rollers are urged outwardly by the torque responsive device into pressure contact with the traction ring under the influence of a force which varies in accordance with the input torque and yet the structure provides a positive motion transmission train for transmitting rotary motion from the drive shaft to the rotary carrier.

In the specific structure, herein disclosed for purposes of illustration, each roller has its small end supported on one end plate of the carrier by means of a spherical bearing. The bearing for the large end of each roller is mounted in a slide or block slidably fitted in a radial guideway provided therefor in the other end plate of the carrier. A traction ring encircles the rollers and is adjustable lengthwise thereof to control their motion. A drive shaft is interrelated with the carrier adjacent the guideways for relative angular motion with respect to the carrier and has a cam fixed thereto and engageable with the inner ends of the slides so that when the drive shaft rotates the cam forces the slides outwardly to bring the rollers into pressure contact with their ring and also to transmit rotary movement to the carrier.

With a transmission of this character the tendency of centrifugal force to develop pressure contact between the planet rollers and their traction ring may be suitably modified by the use of springs. For example, tension springs or their equivalents may be utilized to oppose to the extent of completely counteracting or reducing to the extent desired the action of centrifugal force or compression springs or the like may be employed to supplement it. By omitting the springs or using compression springs it is feasible to resort to low input speeds.

Another advantage of the present invention is that the transmission may be readily supported in any desired angular position.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing a transmission embodying the present invention;

Figure 2 is a view in longitudinal vertical section taken on line 2—2 of Figure 1 with parts shown in elevation for the sake of illustration;

Figure 3 is a detail perspective view of one of the clamping or mounting rings employed for the transmission;

Figure 4 is a view in transverse section taken on line 4—4 of Figure 2;

Figure 5 is a similar view taken on line 5—5 of Figure 2;

Figure 6 is a similar view taken on line 6—6 of Figure 2;

Figure 7 is a perspective view of the rotary carrier and associated parts; and

Figure 8 is a fragmentary view partly in section and partly in elevation and illustrating the manner in which compression springs may be utilized in the transmission to aid in the development of pressure contact between the planet rollers and their control ring.

Referring to the drawings, it will be seen that in the embodiment of the invention there illustrated, the device comprises generally a cylindrical casing C housing the variable speed transmission proper designated generally at V. One end of the casing C is closed by an end head H. The opposite end of the casing C is connected by means of an adapter or annular connecting member A to an electric motor designated generally at M.

The variable speed transmission V comprises a rotary carrier designated generally at 10 and made up of spaced end members or plates 11 and 12 and longitudinally extending connecting members 13 integral with said plates 11 and 12.

A plurality, preferably two, longitudinally tapered or conical planetary rollers 14 are supported for rotation with and with respect to the carrier and for swinging movement radially of the carrier about their small ends as fulcra.

Each roller 14 is provided with a journal or trunnion 15 adajacent its small end. A spherical bearing assembly 16 cooperates with each journal 15 and is supported and releasably secured in an opening provided therefor in the end plate 11 of the carrier 10. Each spherical bearing assembly 16 may have its outer race with a spherical inner surface engageable with the balls in a manner common in this type of bearing, or its outer race may have a spherical outer surface slidably or rockably interfitted with the correspondingly formed wall of the opening in the carrier end plate 11 which accommodates the bearing 16. These expedients are of course illustrative and not restrictive. Obviously various other structures may be resorted to to accomplish this purpose.

Each roller 14 is provided at its large end with a trunnion or journal 18 rotatably mounted in a ball bearing assembly 19. Each ball bearing assembly 19 is supported in a bearing block or slide 20. Each bearing block or slide 20 has a working or sliding fit in a radial guideway 21 provided therefor in the end plate 12 of the carrier 10.

The radial guideways 21 intersect an axially extending central opening 22 provided in the end plate 12 of the rotary carrier.

A non-rotatable, non-resilient traction ring 23 encircles the rollers 14 and is adjustable lengthwise thereof to control their action. The means supporting the ring 23 for lengthwise adjustment and for imparting adjusting movement thereto will be hereinafter more fully described.

The armature shaft of the electric motor M is designated at 24 and has an integral extension 25 which projects into the axial opening 22 of the end plate 12 of the carrier 10. The extreme inner end of this extension 25 is flattened as at 25' and is fitted in a correspondingly formed opening in the hub of a cam 26. The opening in the cam is slightly longer than the large diameter of the flattened portion 25' of the shaft extension 25 so that the cam may adjust itself automatically to compensate for inaccuracies. This cam 26 engages the inner surfaces or faces of the bearing blocks 20. The cam 26 has such contour or its active faces and the cooperable faces of the bearing blocks or slides 20 are of such shape that the desired relationship between the angular movement of the cam and the radial movement of the bearing blocks is obtained. This relationship could remain constant or follow any desired law depending upon the results sought.

One end of the rotary carrier is supported for rotary movement by means of a bushing 30 which has a flange 31 fastened to the end plate 12 of the carrier and whose body portion is supported by means of a ball bearing assembly 32 on an internal partition or web 33 of the adapter A. Internally the body of the bushing 30 is provided with a bearing ring 34 which engages an annular enlargement 35 on the extension 25 of the armature shaft 24 to support this portion of the shaft for rotation.

The opposite end of the rotary carrier has an integral stud shaft 36 projecting axially therefrom and engaging the inner race of a ball bearing assembly 37 carried by an extension 38 of the hub 39 of an internal gear 40. This internal gear 40 is keyed to and supported on the driven shaft 41 which is rotatably mounted in ball bearing assembly 42 provided therefor on the end head H.

The internal gear 40 meshes with the planet pinions 43 which are keyed to integral extensions 44 of the planet rollers.

The traction ring 23 may be supported for movement lengthwise of the planet rollers 14 and adjusted longitudinally thereof in various ways. One construction which may be employed for this purpose will now be described.

The traction ring 23 is secured in any suitable way as by means of stud screws 50 to a cylindrical member or sleeve 51 slidably supported on suitable internal guides provided on the casing C. A rack 52 is suitably fastened to one portion of the sleeve 51 and extends longitudinally thereof. A pinion 53 meshes with this rack 52 and is secured to the lower end of a shaft 54. Shaft 54 is rotatably mounted in a bearing 55 provided on a removable section of the casing C and at its upper end has a worm wheel 56 fixed thereto. A worm 57 meshes with the wheel, the worm 57 being fixed to the inner end of a worm shaft 58 rotatably supported in bearings provided therefor in a casing 59 for these parts. A hand wheel 60 is secured to the outer end of the worm wheel shaft which projects beyond the casing 59. The worm wheel 60 may be provided with a handle or knob 61 whereby it may be turned. An indicated disk 62 equipped with a suitable pointer 63 may be fastened to the upper end of the shaft 54 and co-act with a suitable dial 64.

Where the electric motor M is combined with the casing C of the transmission by means of the adapter A in the manner described it is convenient to provide ventilating ducts 65 in the adapter A so that the air which ventilates the motor M has a cooling effect on the transmission.

For the purpose of mounting the transmission in any convenient angular adjustment a pair of supporting or clamping bands designated generally at 70 are provided. Each clamping band 70 consists of a flat and if desired, slotted ring which is split as indicated at 71. Adjacent the split 71 the band has outwardly extending and opposed apertured lugs 72 designed to cooperate with screws, bolts, and nuts or other suitable fastening devices whereby the bands may be securely clamped in engagement with the casing C of the transmission. Each band also has a pair of outwardly directed apertured attaching lugs 74 adapted to be utilized to secure the bands to any suitable support.

In the operation of a transmission of the character thus far described the rotation of the shaft 24 will cause some slight initial relative movement between the cam 26 and the slides 20 to force the slides 20 outwardly and consequently bring the rollers into pressure contact with their traction ring 23. There is but slight relative movement but throughout the operation of the transmission the force with which the rollers are pressed into contact with the traction ring varies in accordance with the input torque. Moreover, the leverage through which the force developing the pressure between the planet rollers and their traction ring acts varies with the position of the ring lengthwise of the rollers due to the mounting of the rollers for outward swinging movement about their small ends as fulcra. As pointed out this has the advantage of developing the required ring torque at low speed.

In some designs as the transmission is started up the planet rollers are brought into engagement with the traction ring by the action of centrifugal force but the contact pressure between the rollers and the ring is varied by the action of the cam.

A structural organization of this character makes it possible to have complete control over the action of centrifugal force. For example, the tendency of centrifugal force to swing the rollers outwardly may be modified, that is, completely counteracted or reduced as desired by means of tension coil springs 80. As illustrated in Figure 4 two such springs 80 may be provided, the springs extending through the opening 20 and through openings 81 provided therefor in the carrier. The ends of the springs may be suitably attached to cross strips 82 secured by screws 83 to the slides 20 and projecting at their ends beyond the slides to adapt them for connection with the ends of the tension springs. The end plate 12 of the carrier is cut away as at 84 to accommodate the projecting ends of these strips. If desired the springs 80 may be omitted or they may be replaced by compression springs 80' which, as illustrated in Figure 8, tend to force the strips 82 and consequently the slides 20 and the large ends of the rollers outwardly.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A variable speed transmission of the character described comprising a rotary carrier including spaced end plates and longitudinally extending members connecting said end plates, a conical planetary roller having journals at its ends, a spherical bearing mounted on one of the end plates of the carrier and co-acting with the journal at the small end of the roller to mount the roller for rotation with the carrier and with respect thereto and for swinging movement radially thereof, a slide having a bearing co-acting with the journal at the large end of the roller, said carrier having a radially extending guideway in which said slide is fitted, a traction ring encircling the roller and adjustable lengthwise thereof to control its motion, a drive shaft interrelated with the carrier adjacent said guideway for rotary movement relative to the carrier, and a cam fixed to the drive shaft and engaging said slide for forcing it outwardly in its guide whereby the pressure developed between the roller and its ring varies in accordance with the input torque and the position of the ring longitudinally of the roller.

2. A variable speed transmission of the character described comprising a rotary carrier, a plurality of conical planetary rollers, means supporting the small end of each of said rollers on said carrier for rotation therewith and with respect thereto and for swinging movement radially thereof, a bearing for the large end of each roller, a slide for each of said bearings, said carrier having a radially extending guideway for each of said slides whereby each roller is constrained to swinging movement in a plane which includes the axis of rotation of the carrier, a traction ring encircling said rollers and adjustable lengthwise thereof to control their motion, a drive shaft interrelated with the carrier adjacent the slides for rotary movement relative to the carrier, and a cam fixed on the drive shaft and engageable with the slides.

3. A variable speed transmission of the character described comprising a rotary carrier, a plurality of conical planetary rollers, means supporting the small end of each of said rollers on said carrier for rotation therewith and with respect thereto and for swinging movement radially thereof, a bearing for the large end of each roller, a slide for each of said bearings, said carrier having a radially extending guideway for each of said slides, a traction ring encircling said rollers and adjustable lengthwise thereof to control their motion, and driving means for the transmission including a torque responsive device cooperable with the slides whereby the pressure developed between the rollers and their ring varies with the input torque and the position of said ring lengthwise of the rollers.

4. A variable speed transmission of the character described comprising a rotary carrier, a plurality of conical planetary rollers, means supporting the small ends of the rollers on the carrier for rotation therewith and with respect thereto and for swinging movement radially thereof, means co-acting with the large ends of the rollers and the carrier to constrain the rollers to swinging movement radially of the carrier, said last-named means also constraining said rollers to revolve with the carrier while providing for their rotation relative thereto, a traction ring encircling said rollers and adjustable lengthwise thereof to control their motion, a drive shaft, and means establishing a driving relation between the drive shaft and the carrier and including a torque responsive device for forcing the large ends of the rollers radially outward.

5. A variable speed transmission of the character described comprising a rotary carrier, a plurality of conical planetary rollers, means supporting the small ends of the rollers on the carrier for rotation therewith and with respect thereto and for swinging movement radially thereof, means co-acting with the large ends of the rollers and the carrier to constrain the rollers to swinging movement radially of the carrier, said last-named means also constraining said rollers to revolve with the carrier while providing for their rotation relative thereto, a traction ring encircling said rollers and adjustable lengthwise thereto to control their motion, a drive shaft interrelated with the carrier adjacent the large ends of the roller, and a cam fixed to the drive shaft and cooperable with the means co-acting with the large end of the rollers to force the rollers outwardly and into pressure contact with the ring.

6. A variable speed transmission of the character described comprising a rotary carrier, a conical planetary roller, a spherical bearing supporting the small end of the roller on the carrier for rotation therewith and with respect thereto and for swinging movement radially thereof, means adjacent the large end of the roller and cooperable with the carrier to constrain the large end of the roller for rotation with the carrier and with respect thereto and swinging movement radially of the carrier, a traction ring encircling the roller and adjustable lengthwise thereof to control its motion, spring means associated with the large end of the roller for opposing the action of centrifugal force, and driving means for the carrier including a torque responsive device cooperable with the means associated with the large end of the roller to force the large end of the roller outwardly.

7. A variable speed transmission including a rotary carrier, a conical planetary roller supported on the carrier for rotation therewith and with respect thereto and for swinging movement transversely thereof, a traction ring encircling the roller and adjustable lengthwise thereof to control its motion, and driving means including a drive shaft interrelated with the carrier for relative rotary movement, and a cam fixed to the drive shaft and effective to force the roller into pressure contact with the ring and to transmit motion from the shaft to the carrier.

8. A variable speed transmission of the character described comprising a rotary carrier, a plurality of conical planetary rollers, means supporting the small ends of the rollers on the carrier for rotation therewith and with respect thereto and for swinging movement radially thereof, means co-acting with the large ends of the rollers and the carrier to constrain the rollers to swinging movement radially of the carrier, said last-named means also constraining said rollers to revolve with the carrier while providing for their rotation relative thereto, a traction ring encircling said rollers and adjustable lengthwise thereof to control their motion, a drive shaft, means establishing a driving relation between the drive shaft and the carrier and including a torque responsive device for forcing the large ends of the rollers radially outward, and spring means associated with the large ends of the rollers to modify the tendency of centrifugal force to develop pressure contact between the rollers and the ring.

9. A variable speed transmission of the character described comprising a rotary carrier, a plurality of conical planetary rollers, means supporting the small ends of the rollers on the carrier for rotation therewith and with respect thereto and for swinging movement radially thereof, means co-acting with the large ends of the rollers and the carrier to constrain the rollers to swinging movement radially of the carrier, said last-named means also constraining said rollers to revolve with the carrier while providing for their rotation relative thereto, a traction ring encircling said rollers and adjustable lengthwise thereof to control their motion, a drive shaft, means establishing a driving relation between the drive shaft and the carrier and including a torque responsive device for forcing the large ends of the rollers radially outward, and tension springs interconnecting the large ends of the rollers and opposing the action of centrifugal force therein.

10. A variable speed transmission of the character described comprising a rotary carrier, a plurality of conical planetary rollers, means supporting the small ends of the rollers on the carrier for rotation therewith and with respect thereto and for swinging movement radially thereof, means co-acting with the large ends of the rollers and the carrier to constrain the rollers to swinging movement radially of the carrier, said last-named means also constraining said rollers to revolve with the carrier while providing for their rotation relative thereto, a traction ring encircling said rollers and adjustable lengthwise thereof to control their motion, a drive shaft, means establishing a driving relation between the drive shaft and the carrier and including a torque responsive device for forcing the large ends of the rollers radially outward, and spring means for urging the large ends of the rollers outwardly.

11. A variable speed transmission of the character described comprising a rotary carrier, a plurality of conical planetary rollers, means supporting the small end of each of said rollers on said carrier for rotation therewith and with respect thereto and for swinging movement radially thereof, a bearing for the large end of each roller, a slide for each of said bearings, said carrier having a radially extending guideway for each of said slides whereby each roller is constrained to swinging movement in a plane which includes the axis of rotation of the carrier, a traction ring encircling said rollers and adjustable lengthwise thereof to control their motion, a drive shaft interrelated with the carrier adjacent the slides for rotary movement relative to the carrier, a cam fixed on the drive shaft and engageable with the slides, and spring means interconnecting the slides and tensioned to pull them toward the center of the carrier.

12. A variable speed transmission of the character described comprising a rotary carrier, a plurality of conical planetary rollers, means supporting the small end of each of said rollers on said carrier for rotation therewith and with respect thereto and for swinging movement radially thereof, a bearing for the large end of each roller, a slide for each of said bearings, said carrier having a radially extending guideway for each of said slides whereby each roller is constrained to swinging movement in a plane which includes the axis of rotation of the carrier, a traction ring encircling said rollers and adjustable lengthwise thereof to control their motion, a drive shaft interrelated with the carrier adjacent the slides for rotary movement relative to the carrier, a cam fixed on the drive shaft and engageable with the slides, and compression springs between the slides for urging them outwardly.

13. A variable speed transmission of the character described comprising a rotary carrier, a plurality of conical planetary rollers supported on the carrier for rotation therewith and with respect thereto and for swinging movement radially of the carrier about the small ends of the rollers as fulcra, a traction ring encircling the rollers and adjustable lengthwise thereof to control their motion, and driving means including a drive shaft interrelated with the carrier for relative angular movement and cooperating camming means operatively interrelating the drive shaft and the large ends of the rollers for forcing the rollers outwardly into pressure contact with the ring and for transmitting rotary motion from the drive shaft to the carrier.

14. A variable speed transmisison of the character described comprising a rotary carrier, a plurality of conical planetary rollers supported on the carrier for rotation therewith and with respect thereto and for swinging movement radially of the carrier about the small ends of the rollers as fulcra, a traction ring encircling the rollers and adjustable lengthwise thereof to control their motion, a drive shaft interrelated with the carrier for relative angular movement and motion transmission means between the drive shaft and the carrier and including a cam fixed to the drive shaft and effective to force the large ends of the rollers outwardly into pressure contact with the ring.

15. A variable speed transmission of the character described comprising a rotary carrier, a plurality of conical planetary rollers supported on said carrier for rotation therewith and with respect thereto, and for movement transversely with respect to the axis of rotation of the carrier, a traction ring encircling the rollers and adjustable lengthwise thereof to control their motion, a drive shaft, and motion transmission means between the drive shaft and the carrier including a cam effective to force the rollers transversely outwardly into pressure contact with said ring.

16. A variable speed transmission of the character described comprising a rotary carrier, a plurality of conical planetary rollers supported on said carrier for rotation therewith and with respect thereto, and for movement transversely with respect to the axis of rotation of the carrier, a traction ring encircling the rollers and adjustable lengthwise thereof to control their motion, driving means, a torque responsive motion transmission means between the driving means and the carrier effective to rotate the carrier from the driving means and to force the rollers transversely outwardly into pressure contact with said ring.

17. A variable speed transmission of the character described comprising a rotary carrier, two diametrically opposite, conical planetary rollers, means supporting the small end of each of said rollers on said carrier for rotation therewith and with respect thereto and for swinging movement radially thereof, a bearing for the large end of each roller, a slide for each of said bearings, said carrier having two opposed, radially extending guideways, in each of which one of said slides is fitted for sliding movement, whereby the rollers are constrained to swinging movement in a plane which includes the axis of rotation of the carrier, a traction ring encircling said rollers and adjustable lengthwise thereof to control their motion, and means interposed between and engaging both of said slides for forcing them into pressure contact with said ring.

18. A variable speed transmission of the character described comprising a rotary carrier, two diametrically opposite, conical planetary rollers, means supporting the small end of each of said rollers on said carrier for rotation therewith and with respect thereto and for swinging movement radially thereof, a bearing for the large end of each roller, a slide for each of said bearings, said carrier having two opposed, radially extending guideways, in each of which one of said slides is fitted for sliding movement, whereby the rollers are constrained to swinging movement in a plane which includes the axis of rotation of the carrier, a traction ring encircling said rollers and adjustable lengthwise thereof to control their motion, and a spring disposed between the slides having one end engaged with one of the slides and the other end engaged with the other of said slides and acting to force both of the slides outwardly to develop a working pressure between the rollers and the ring.

19. A variable speed transmission of the character described comprising a rotary carrier, bearings therefor, a pair of conical planetary rollers, means supporting the small end of each of said rollers on said carrier for rotation therewith and with respect thereto and for swinging movement radially thereof, a bearing for the large end of each roller, a slide for each of said bearings, said carrier having two opposed, radially extending guideways, in each of which one of said slides is fitted for sliding movement, whereby the rollers are constrained to swinging movement in a plane which includes the axis of rotation of the carrier, a traction ring encircling said rollers and adjustable lengthwise thereof to control their action, and pressure inducing means interposed between and pressing outwardly against both of said slides to force them outwardly and develop a working pressure between the rollers and the ring in such manner that the reaction force of each slide to the pressure inducing means is equal to the pressure applied by said means to the other slide, thereby preventing the application of unequal forces to said carrier and said carrier bearings.

20. A variable speed transmission of the character described comprising a rotary carrier, a pair of conical planetary rollers, means supporting the small end of each of said rollers on said carrier for rotation therewith and with respect thereto and for swinging movement radially thereof, a bearing device for the large end of each roller, said carrier having two opposed, radially extending guideways in each of which one of said bearing devices is slidably fitted to constrain the rollers to swinging movement in a plane which includes the axis of rotation of the carrier, a traction ring encircling said rollers and adjustable lengthwise thereof to control their action, and pressure inducing means interposed between and pressing outwardly against both of said bearing devices, said pressure inducing means reacting against as well as applying pressure to both of said bearing devices, whereby the reaction force of each bearing device to the pressure inducing means is equal to the pressure applied by said means to the other bearing device.

ALAIN MADLÉ.